United States Patent [19]

Smith

[11] Patent Number: 4,713,114

[45] Date of Patent: Dec. 15, 1987

[54] TIRE SEALING AND BALANCING COMPOSITION

[76] Inventor: Gerald P. Smith, 1346 Zebulon Ave., Columbus, Ohio 43224

[21] Appl. No.: 841,034

[22] Filed: Mar. 17, 1986

Related U.S. Application Data

[63] Continuation of Ser. No. 764,530, Aug. 12, 1985, which is a continuation of Ser. No. 544,808, Oct. 24, 1983, which is a continuation of Ser. No. 486,271, Apr. 18, 1983, which is a continuation of Ser. No. 330,045, Dec. 11, 1981, abandoned.

[51] Int. Cl.$^4$ ............................................... C09K 3/10
[52] U.S. Cl. ...................................................... 106/33
[58] Field of Search ........................................... 106/33

[56] References Cited

U.S. PATENT DOCUMENTS

| | | | |
|---|---|---|---|
| 2,074,876 | 3/1937 | Wagner | 106/33 |
| 2,286,963 | 6/1942 | Houser | 106/33 |
| 3,282,874 | 11/1966 | Friedrich et al. | 106/33 |
| 3,352,696 | 11/1967 | Wallace | 106/33 |
| 4,137,206 | 1/1979 | Kent | 106/33 |

FOREIGN PATENT DOCUMENTS 767168  1/1957  United Kingdom ............ 106/33

*Primary Examiner*—Theodore Morris
*Attorney, Agent, or Firm*—Sughrue, Mion, Zinn, Macpeak, and Seas

[57] ABSTRACT

A tire sealing and balancing composition comprising:
1. Ethylene Glycol
2. Water
3. Sodium Dichromate
4. Wetting Agents
5. Washed Mica
6. Shore Fiber Asbestos
7. Long Fiber Asbestos
8. A Cellulosic Thickener/Filler.

8 Claims, No Drawings

TIRE SEALING AND BALANCING COMPOSITION

This is a continuation of application Ser. No. 764,530 filed Aug. 12, 1985 which is a continuation of U.S. Ser. No. 544,808 filed Oct. 24, 1983, which is a continuation of U.S. Ser. No. 486,271 filed Apr. 18, 1983, which is a continuation of U.S. Ser. No. 330,045 filed Dec. 11, 1981 all now abandoned.

BACKGROUND OF THE INVENTION

The present invention relates to a tire sealing and balancing composition introduced in small amounts within pneumatic tire assemblies and the like. Hereafter, for brevity, the term "tire" should be understood to refer to pneumatic tires of both the tube and tubeless type since it will be apparent to one skilled in the art that the sealing and balancing composition of the present invention will function with equal effectiveness with pneumatic assemblies in general.

Heretofore, various compounds have been used for sealing and balancing tires to prevent loss of air pressure because of punctures or small leaks, and to balance tires unbalanced by uneven tire wear. The compounds in the prior art have proven insufficient or have lost their effectiveness after a short period of time due to interaction between the components of the composition, evaporation of some of the ingredients or balling up and loss of ability to flow.

SUMMARY OF THE INVENTION

The present invention provides a composition for use within the air space of a tire which functions as a tire sealant and balancing composition that overcomes the disadvantages of the prior art.

The tire sealing and balancing composition of the present invention comprises, as essential components:
1. Ethylene Glycol
2. Water
3. Sodium Dichromate
4. Wetting Agents
5. Washed Mica
6. Short Fiber Asbestos
7. Long Fiber Asbestos
8. A cellulosic Thickener / Filler A primary object of the present invention is to provide a tire sealing and balancing composition.

A further object is to provide an improved tire sealing and balancing composition that maintains sufficient fluidity at all times and at normally encountered temperatures such that automatic balancing occurs upon wear of the tire.

Yet a further object of the present invention is to provide an improved tire sealing and balancing composition that will resist loss of air pressure upon a leak or puncture and maintain a tire and its related wheel assembly in complete balance at all times.

Other objects and advantages will become apparent in the following specification and the appended claims.

DETAILED DESCRIPTION OF THE INVENTION

With respect to the sealing function of the present invention, with the occurrence of leak or puncture the components of the composition of the present invention are forced into the leak opening by the exit air flow and form a seal due to the interaction of solid components on drying.

With respect to the balancing function of the present invention, upon tire rotation the components of the sealing and balancing composition of the present invention flow under the resulting centrifugal force against the interior wall of the tire, fill any irregularities therein and add weight to areas of the tire which are slightly deficient, e.g., which have become lighter in weight due to uneven tire wear.

The tire sealing and balancing composition of the present invention will, when injected into the air space of a tire or innertube, function to seal leaks and maintain balancing of the tire or innertube assembly at all times.

Turning now to the components of the tire sealing and balancing composition of the present invention, I consider the mandatory components to be:
1. Ethylene Glycol
2. Water
3. Sodium Dichromate
4. Wetting Agents
5. Washed Mica
6. Short Fiber Asbestos
7. Long Fiber Asbestos
8. A Cellulosic Thickener / Filler The water has sufficient volatility to dry upon exiting a leak or puncture and with the ethylene glycol has a sufficiently low viscosity to permit components of the composition of the present invention to distribute about the tire during rotation due to centrifugal force.

I use a solid organic thickener/ filler which is a water-soluble modified cellulose that, upon drying, assists in forming a solid rubber-like sealant plug in the leak. I most prefer to use a hydroxyalkyl modified cellulose or a carboxyalkyl modified cellulose, most preferably hydroxyethyl cellulose and/or carboxymethyl cellulose. Such organic thickeners/fillers are commercially available under the tradename Cellosize. Cellosize is preferred for use in the present invention due to its excellent solubility in water, its commerically availability, low cost, chemical stability and superior sealing and balancing effects. The thickener/fillers main purpose is to initiate leak and puncture sealing. If it is absent, a permanent seal will not be effectively formed, but in its presence a rubber-like plug quickly forms.

The main criteria that the fibrous puncture fillers exhibit are insolubility in the liquid carrier and good dispersibility. I use a blend of long and short asbestos fibers as the best fibrous puncture filler. The best lamellar puncture filler I use is washed mica of a size of about 1/16 inch or less; mica of this size typically resembles fibers in form.

Both the asbestos and mica co-operate with the solid thickener/filler to perform a sealing function.

Liquid carrier, must be present in an amount sufficient to dissolve the thickener/filler, permit rapid movement of sealant components to a puncture area and insure a system viscosity sufficient for balancing; the thickener/filler must be present in an amount sufficient to ensure that the composition is not so fluid that it is immediately ejected through a leak or puncture and yet must not be present in proportions which increase viscosity to such a level that the balancing effect is inhibited; the puncture fillers are present in an amount effective to immediately seal any leak or puncture as they are drawn through the leak or puncture with escaping air and interact at the leak site with the dissolved thickener filler to form a rubber-like solid plug in the leak. They must also be present in a proportion sufficient to enable the balancing function of the present invention.

The most preferred composition of the present invention comprises (1050 Gal. batch);
  330 Gallons Ethylene Glycol
  660 Gallons Water
  20.5 Pounds Sodium Dichromate
  6.3 Cups Wetting Agent
  420 Pounds Washed Mica
  475 Pounds Short fiber Asbestos
  25 Pounds Long fiber Asbestos
  52.5 Pounds Cellosize Proportions and sizes can probably be raised up to plus or minus 5%, more safely plus or minus 2%, but I believe the excellent results of the most preferred composition will suffer.

The ethylene glycol/water proportions provide an excellent viscosity/freeze point depression.

The sodium dichromate provides excellent corrosion inhibitions, a marked problem with prior art materials with both steel and aluminum.

Wetting agent idenity does not appear overly important; I currently prefer aerosil C-61 but I believe anionic, nonionic, and catonic wetting agents are useful.

The mica must be washed to avoid rusting; I currently use 325 Mesh. Prior art has not appreciated the importance of using washed mica which shows a reduced impurity level.

The use of short and long fiber asbestos provides improved sealing effects, especially with ¼" holes. Currently I use long fibers (C A ½") asbestos from John Manville. (7 - R S), and short fiber asbestos (C A ¼") from John Manville (4-T-30), both from Canada and of high quality.

The composition of the present invention is formed in a simple fashion at ambient conditions by mixing all mandatory and/or desirable ingredients in a suitable container and then packaging for shipment to purchasers.

However, some care must be taken to avoid product "lumping" as per the prior art. I accomplish this by first mixing the water and ethylene glycol and then adding the remainder of the components in batches where each component is present in a single batch in proportion to its final desired proportion.

Usually I add components 3.–8. in ten equal batches though I believe lesser and greater batch numbers can be used. Thus, e.g., each batch would comprise (approximate) two pounds sodium dichromate, 0.63 cups wetting agent 42 pounds washed mica, etc.

Mixing is till the composition is homogeneous. Assuming ten equally spaced batches, mixing for four hours in a conventional turbo mixer suffices with just in excess of twenty minutes between each batch.

Having thus generally described the invention, I now present the following Example of the currently preferred best mode for producing a composition in accordance with the present invention.

EXAMPLE

A 1,050 gallon batch (approximate) of tire sealing and balancing composition is prepared in the following manner at room temperature.

Water in the amount of 660 gallons was introduced into a container. Then 330 gallons of ethylene glycol were mixed therewith. A turbo mixer was used in this example. Then, in ten equal batches (volume for liquids, weights for solids) components 3.–8. were added with equal mixing time for each individual batch over a four hour period. Each batch comprised; 3.2.5 pounds sodium dichromate.

4. 0.63 cups Aerosil C-61
  5. 0.42 Pounds washed Mica
  6. 47.5 Pounds C A ¼" Asbestos
  7. 2.5 Pounds C A ½" Asbestos
  8. 5.25 Pounds Cellocize After the tenth batch was mixed in for C A twenty minutes, a homogenious composition free of lumps was obtained.

The most simple and convenient way to use the resulting tire sealing and balancing composition is to inject the composition through the tire stem. For automobile tires, about eight ounces will suffice. Whereas for many truck tires 24 oz. will be needed. Wheras in larger tires such as for earth movers, about five gallons of sealing and balancing composition is required. A further surprising effect encountered upon use of the composition of the present invention is that tires containing the composition of the present invention were found to run substantially cooler than tires not containing the composition. Where the tire is flat, one merely removes the valves, injects the composition and reinflates. A simple hand pump is convenient. Injection pressure is not important.

I claim:

1. A tire sealing and balancing composition consisting essentially of:
   water;
   ethylene glycol in an amount of about 50% by weight of the water;
   a corrosion inhibitor;
   washed mica;
   short fiber asbestos having a length of about ¼ inch;
   long fiber asbestos having a length of about ½ inch; and
   a cellulosic thickener/filler.

2. The composition of claim 1, wherein the corrosion inhibitor is sodium dichromate.

3. The composition of claim 2, which further comprises a wetting agent.

4. The composition of claim 3, wherein the thickener/filler is selected from the group consisting of hydroxyethyl cellulose, carboxymethyl cellulose and a mixture thereof.

5. The composition of claim 1, wherein the washed mica is present in an amount of about 3 to about 4.5%;
   the short fiber and long fiber asbestos are present in an amount of about 2.5 to about 4.5%;
   the cellulosic thickener/filler is selected from the group consisting of hydroxyethyl cellulose, carboxymethyl cellulose or a mixture thereof and is used in an amount of about 0.3 to about 1%.

6. A tire sealing and balancing composition consisting essentially of:
   water;
   ethylene glycol in an amount of about 50% by weight of the water;
   sodium dichromate as a corrosion inhibitor;
   washed mica having a size of 325 mesh;
   short fiber asbestos having a length of about ¼ inch;
   long fiber asbestos having a length of about ½ inch;
   hydroxy ethyl cellulose, carboxymethyl cellulose or a mixture thereof as a thickener/filler;
   a wetting agent;
   wherein the washed mica is present in an amount of about 3 to about 4.5%, the short fiber and long fiber asbestos are present in an amount of about 2.5 to about 4.5%; and the hydroxy ethyl cellulose, carboxymethyl cellulose or a mixture thereof is present in an amount of about 0.3 to about 1%.

7. A tire sealing and balancing composition consisting essentially of the following components at proportions which correspond to the amounts given, ±5%:
   660 gallons of water;
   330 gallons of ethylene glycol;
   20.5 pounds of sodium dichromate;
   6.3 pounds of a wetting agent;
   420 pounds of washed mica having a size of 325 mesh;
   475 pounds of short fiber asbestos having a size of about ¼ inch;
   25 pounds of long fiber asbestos having a size of about ½ inch; and
   52.5 pounds of hydroxy ethyl cellulose, carboxymethyl cellulose or a mixture thereof.

8. The tire sealing and balancing composition of claim 7, wherein all components are present in an amount of ±2% of the recited proportions.

* * * * *